US006003684A

United States Patent [19]

Eickhoff et al.

[11] Patent Number: 6,003,684

[45] Date of Patent: Dec. 21, 1999

[54] DEVICE FOR DEWATERING SOLID-LIQUID SUSPENSIONS

[75] Inventors: Karl Eickhoff, Graz; Peter Scheucher, Kumberg; Georg Reck, Graz, all of Austria

[73] Assignee: Andritz-Patentverwaltungs-Gesellschaft m.b.H., Graz, Austria

[21] Appl. No.: 09/117,059

[22] PCT Filed: Oct. 31, 1996

[86] PCT No.: PCT/EP96/04748

§ 371 Date: Jan. 25, 1999

§ 102(e) Date: Jan. 25, 1999

[87] PCT Pub. No.: WO97/17192

PCT Pub. Date: May 15, 1997

[30] Foreign Application Priority Data

Nov. 10, 1995 [AT] Austria .................................... 1849/95

[51] Int. Cl.$^{6}$ ............................. B30B 9/24; B01D 33/04; B01D 33/056; C02F 11/12

[52] U.S. Cl. .......................... 210/401; 210/109; 210/111; 210/137; 210/143; 100/118; 100/151; 100/152; 100/153

[58] Field of Search .................................... 210/109, 111, 210/137, 143, 401; 100/118, 151, 152, 153

[56] References Cited

U.S. PATENT DOCUMENTS

| | | |
|---|---|---|
| 3,605,607 | 9/1971 | Guer . |
| 3,894,486 | 7/1975 | Sparowitz et al. . |
| 4,147,101 | 4/1979 | Heissenberger . |
| 4,181,616 | 1/1980 | Bahr . |
| 4,266,474 | 5/1981 | Bahr . |
| 4,544,447 | 10/1985 | Pinter . |
| 4,584,936 | 4/1986 | Crandall et al. . |
| 4,885,088 | 12/1989 | Sbaschnigg . |
| 5,082,562 | 1/1992 | Burger . |
| 5,109,764 | 5/1992 | Kappel et al. . |
| 5,196,090 | 3/1993 | Corbellini et al. . |
| 5,456,832 | 10/1995 | Louden et al. . |
| 5,545,333 | 8/1996 | Louden et al. . |

FOREIGN PATENT DOCUMENTS

| | | |
|---|---|---|
| 13458 | 7/1980 | European Pat. Off. . |
| 2246055 | 4/1973 | Germany . |

*Primary Examiner*—Thomas M. Lithgow
*Attorney, Agent, or Firm*—Alix, Yale & Ristas, LLP

[57] ABSTRACT

A device for dewatering solid-liquid suspensions, in particular pulp suspensions, in which the suspension is dewatered between two belts and a dewatering zone is formed in the shape of a wedge between the two belts. The wedge height at its end closest to the outlet is adjustable over the entire belt width by an adjusting element.

26 Claims, 2 Drawing Sheets

DEVICE FOR DEWATERING SOLID-LIQUID SUSPENSIONS

Figure 1:
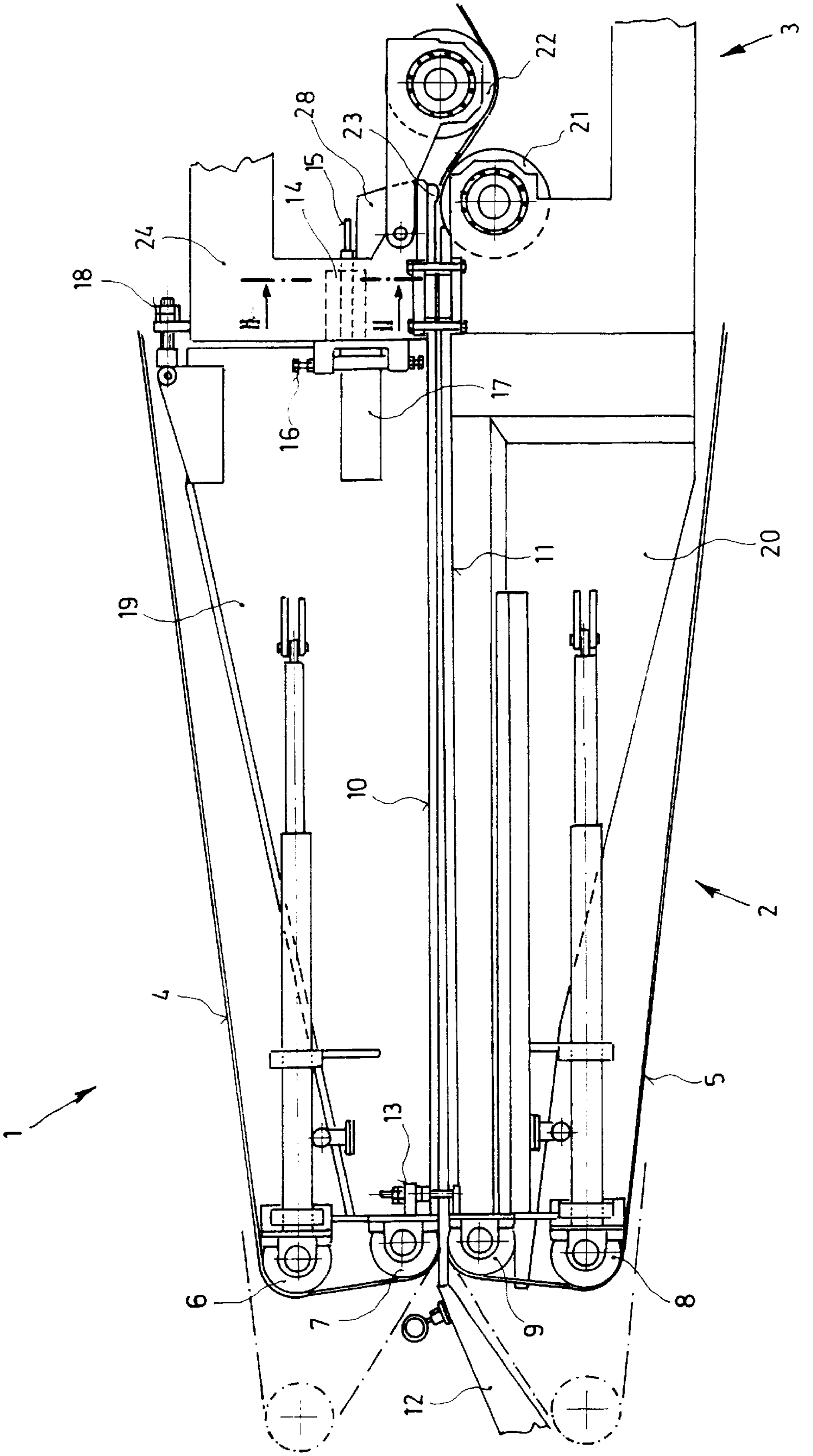

This is the U.S. national stage of International Application No. PCT/EP96/04748 filed Oct. 31, 1996.

The invention relates to a device for dewatering solid-liquid suspensions, in particular pulp suspensions, on which the suspension is dewatered between two belts, a dewatering zone being formed in the shape of a wedge zone.

Such devices, as are known from AT 385.793, for example, have the disadvantage of being severely limited in their production spectrum and in the obtainable dry content when producing mats with different basis weights. A fixed gap at the end of the wedge only allows a small, restricted range of basis weights. Here, a high basis weight yields a high dry content and a low basis weight a low dry content. If the pressure is too great at the end, particularly with pulps that are difficult to dewater, the pulp is squeezed out at the sides. Further due to the high pressure also the deckle sealing in the wedge zone may be damaged. As the basis weight rises, this leads to higher pressures and, as a result, the drive power the machine requires because of the frictional force is so great that the machine comes to a standstill.

The aim of the invention is, thus, to create a machine which also permits high dry content levels at high basis weights, without the pulp, particularly if it is difficult to dewater, being squeezed out at the sides or the deckle sealings being damaged, and where the risk of the machine coming to a standstill is virtually eliminated.

According to the invention, this is achieved by making the wedge height adjustable, particularly over the entire belt width, at the wedge outlet end, in particular automatically, e.g. elastically. Since the wedge height at the outlet end can be adjusted, the correct gap can always be set for the appropriate basis weight.

An advantageous further development of the invention is characterized by the top section of the wedge, or alternatively the bottom section of the wedge, being adjustable, in particular automatically, e.g. elastically. With these variants, the wedge can be set at the optimum height to suit the other structural features of the machine.

A favorable configuration of the invention is characterized by the adjustment being made using one or more pneumatic elements arranged over almost the entire machine width, with flexible tubes or pneumatic cylinders being provided as pneumatic elements. As an alternative, the adjustment can be made using one or more hydraulic elements arranged over almost the entire machine width, with bellows, flexible tubes or hydraulic cylinders being provided as hydraulic elements. By using pneumatic or hydraulic elements to set the wedge height at the outlet end, the gap can set itself automatically with the pressure occurring. Particularly the embodiment with flexible tubes or bellows extending over almost the entire machine permits the wedge height to be adjusted to suit the basis weight in this way, even if the pulp is not evenly distributed, for example if a wedge plate is slanted. By adapting to prevailing conditions, the machine also remains operative if there are brief pressure fluctuations in the pulp or if the mat is thicker or arches in places. Thus, greater reliability of service is provided.

A favorable further development of the invention is characterized by either the top section or the bottom section of the wedge being spring-supported.

A favorable configuration of the invention is characterized by the top and bottom sections of the wedge being connected mechanically, in particular adjustably, at the side of the headbox. Due to the mechanical connection between the top and bottom sections of the wedge on the side facing the headbox, corresponding influence can be exerted on the thickness of the filter cake produced and also on dewatering of the mat by the existing apropriate length of the wedge zone.

A favorable further development of the invention is characterized by the maximum and minimum gap adjustment being restricted by limit stops. By limiting the maximum adjustment, dewatering of the material is always guaranteed, whereas a restriction on minimum adjustment avoids damage to the machine in no-load operation. The gap can be set according to the change in the deckle sealings such that they are always operative.

A favorable configuration of the invention is characterized by the wedge zone continuing beyond the center of the first subsequent roll, particularly an S-roll, where the top or, alternatively, the bottom section of the wedge, depending on the roll configuration, extends past the roll center and its opposite wedge section projects into the space between dewatering belt and roll. With this design, the pulp web between the belts is stabilized up to the first S-roll, which prevents fibers from building up upstream of the S-roll and the pulp then being squeezed out at the sides of the dewatering belt upstream of the S-module. In addition, the filter cake does not expand subsequently and re-wetting is thus prevented. As a result, the throughput of the dewatering device is increased, particularly for pulps that are difficult to dewater, such as low-freeness pulps.

The primary advantage of the invention is that it is possible to adapt wedge dewatering rapidly to different pulp grades by changing the wedge pressure, with practically no effect on the basis weight because the press is adapted automatically to the changes in the operating parameters, e.g. basis weight, dewaterability, while the pressure at the end of the wedge always remains the same. By preventing pulp from escaping at the end of the wedge, particularly by means of the wedge zone extending past the center of the first S-roll, the dewatering unit is much less sensitive to fluctuations in pulp quality. If the basis weight fluctuates, the elastic wedge opening prevents jamming.

Figure 2:
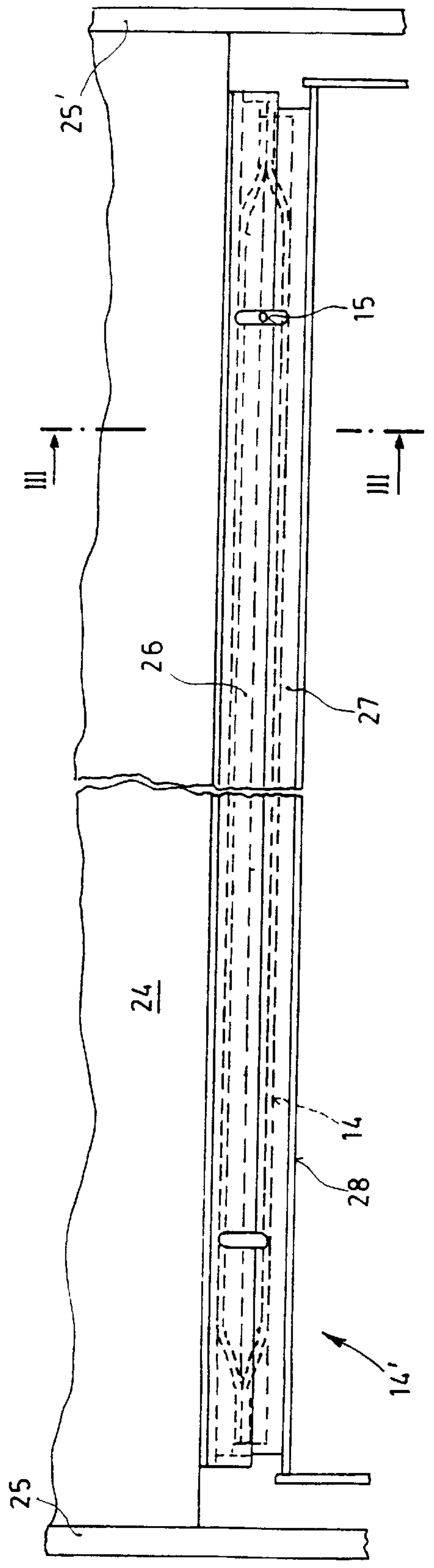
Figure 3:
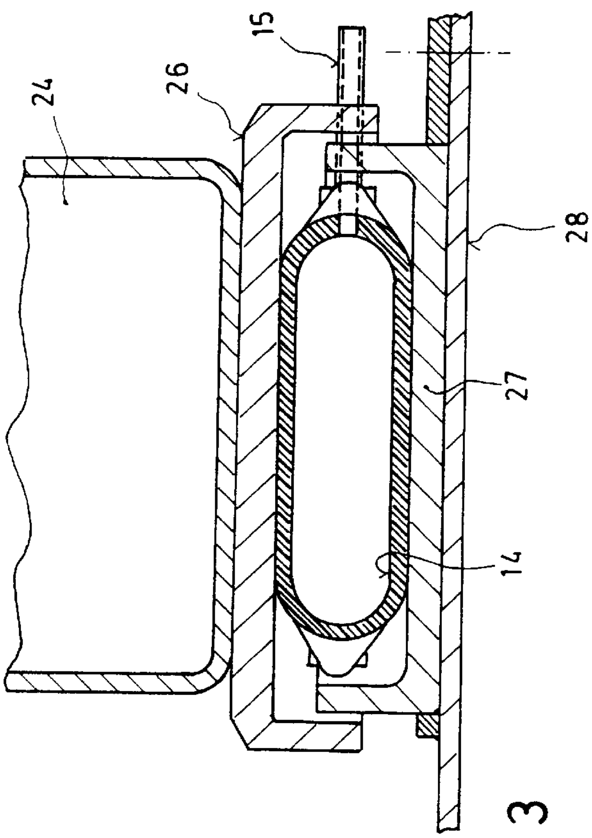

The invention will now be described in examples and referring to the drawings, where FIG. 1 shows a section of a dewatering machine with wedge zone, FIG. 2 illustrates a cross-section through the line marked II—II in FIG. 1, and FIG. 3 shows a cross-section through the line marked III—III in FIG. 2.

The dewatering device I with a wedge zone 2 and a further dewatering zone, particularly an S-zone 3, is illustrated in FIG. 1. Here, a top wire or filter belt 4 runs over a top deflection roll 6, whose position can be adjusted and regulated, and then over a deflection roll 7 into the wedge formed by plates 10 and 11. The second wire or filter belt 5 also runs over an appropriate deflection roll 8 and a further deflection roll 9 into the wedge. The material to be dewatered, for example, pulp, is fed through a headbox 12 and also into the wedge. The top 10 and bottom 11 sections of the wedge are connected mechanically at the side of the headbox using a threaded spindle 13 and the spacing between the two sections is adjustable. After leaving the gap, the belts 4 and 5, with the pulp web between the two, are deflected round S-rolls 21 and 22, thus effecting further dewatering. The height of the top wedge section 10 can be adjusted here using a pneumatic or hydraulic tube 14. The compressed air or hydraulic fluid is supplied through a connection point 15. Stop screws 16 are used to limit the minimum and maximum adjusting distance. A slide plate 17 is provided to absorb the axial forces. Further, a support 18 is provided for cantilevering, i.e. for changing the endless woven belts. In order to affect the direct vicinity as little as possible, a hood 19 is integrated into the top wedge section 10 and a filtrate tray 20 into the bottom wedge section 11. At the end of the wedge, the top wedge section 10 has an extension piece 23 which extends beyond the center of the S-roll 21. In this way, the dewatering zone is extended on the one hand, and on the other, the fibers do not build up upstream of the S-zone, thus the pulp is not squeezed out at the sides.

FIG. 2 shows a section through the adjusting element 14'. This illustration shows the beam 24 for the top frame section as well as the side sections 25, 25' of the frame. The beam 24 rests on an upper profile 26 projecting beyond a bottom profile 27, which is attached securely to the bottom frame section 28. Between the top profile 26 and the bottom profile 27 there is a pneumatic or hydraulic tube which is supplied with air or hydraulic fluid, respectively, through a connection point 15. The frame section 28 securely connected to the top wedge section 10 can thus be pressed against the top frame section 24 in accordance with the pressure in the tube 14. The wedge height adjusts according to the pressures in the wedge and the pressure in the tube 14.

FIG. 3 shows a section through the line marked III—III in FIG. 2, with the exact structure of the top profile 26, the bottom profile 27 and the tube 14 between the two, with the appropriate connections to the top frame 24 and the frame section 28 connected to the top wedge section 10.

The invention is not restricted to the examples illustrated, but can also be used in other belt presses, such as are used in sewage sludge dewatering, for example.

We claim:

1. In a device for dewatering pulp suspensions between two moving belts in an adjustable dewatering wedge wherein the improvement comprises the wedge being formed by a top plate and a bottom plate defining a wedge gap between the plates with the belts moving through the wedge gap then passing over a dewatering roll which rotates about a center, wherein the device includes means for elastically adjusting the wedge gap over the entire belt width adjacent said roll, and the wedge continues to the roll with one plate extending to the roll and the other plate extending beyond the center of the roll.

2. Device according to claim 1, wherein the top plate is adjustable automatically elastically, and the bottom plate of the wedge is fixed.

3. Device according to claim 1, wherein the bottom wedge plate is adjustable automatically elastically, and the bottom plate of the wedge is fixed.

4. Device according to claim 1 wherein the means for adjusting comprises at least one pneumatic element arranged substantially completely across the width of the belts.

5. Device according to claim 4, wherein at least one tube is provided as the pneumatic element.

6. Device according to claim 4, wherein pneumatic cylinders are provided as the pneumatic elements.

7. Device according to claim 1, wherein the means for adjusting comprises at least one hydraulic element arranged substantially completely across the width of the belts.

8. Device according to claim 7, wherein at least one bellow or tube is provided as an hydraulic element.

9. Device according to claim 7, wherein hydraulic cylinders are provided as hydraulic elements.

10. Device according to claim 1 wherein one of the top plate or the bottom plate of the wedge is spring-supported.

11. Device according to claim 1, wherein a headbox is located adjacent an inlet end of the wedge and the top and bottom plates of the wedge are connected mechanically and adjustably laterally of the headbox.

12. Device according to claim 1, wherein stop means are provided for limiting the maximum and minimum gap adjustment.

13. Device according to claim 1, wherein the top wedge plate extends past the roll center and the bottom wedge plate extends to the roll.

14. Device according to claim 1, wherein the bottom wedge plate extends past the roll center.

15. Device according to claim 2, wherein the means for adjusting comprises at least one pneumatic element arranged substantially completely across the width of the belts.

16. Device according to claim 3, wherein the means for adjusting comprises at least one pneumatic element arranged substantially completely across the width of the belts.

17. Device according to claim 2, wherein the means for adjusting comprises at least one hydraulic element arranged substantially completely across the width of the belts.

18. Device according to claim 3, wherein the means for adjusting comprises at least one hydraulic element arranged substantially completely across the width of the belts.

19. Device according to claim 15, wherein one of the top plate or the bottom plate of the wedge is spring-supported.

20. Device according to claim 16, wherein one of the top plate or the bottom plate of the wedge is spring-supported.

21. Device according to claim 17, wherein one of the top plate or the bottom plate of the wedge is spring-supported.

22. Device according to claim 18, wherein one of the top plate or the bottom plate of the wedge is spring-supported.

23. Device according to claim 15, wherein a headbox is located adjacent an inlet end of the wedge and the top and bottom plates of the wedge are connected mechanically and adjustably laterally of the headbox.

24. Device according to claim 16, wherein a headbox is located adjacent an inlet end of the wedge and the top and bottom plates of the wedge are connected mechanically and adjustably laterally of the headbox.

25. Device according to claim 17, wherein a headbox is located adjacent an inlet end of the wedge and the top and bottom plates of the wedge are connected mechanically and adjustably laterally of the headbox.

26. Device according to claim 18, wherein a headbox is located adjacent an inlet end of the wedge and the top and bottom plates of the wedge are connected mechanically and adjustably laterally of the headbox.

* * * * *